US012582953B2

(12) United States Patent
Ito et al.

(10) Patent No.: US 12,582,953 B2
(45) Date of Patent: Mar. 24, 2026

(54) HYDROGEN RELEASE/STORAGE SYSTEM, HYDROGEN RELEASE/STORAGE METHOD, AMMONIA PRODUCTION EQUIPMENT, GAS TURBINE, FUEL CELL, AND STEEL MILL

(71) Applicant: MITSUBISHI HEAVY INDUSTRIES, LTD., Tokyo (JP)

(72) Inventors: Hideki Ito, Tokyo (JP); Wataru Matsubara, Tokyo (JP); Takashi Yoshimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 658 days.

(21) Appl. No.: 17/917,716

(22) PCT Filed: Apr. 8, 2021

(86) PCT No.: PCT/JP2021/014960
§ 371 (c)(1),
(2) Date: Oct. 7, 2022

(87) PCT Pub. No.: WO2021/210496
PCT Pub. Date: Oct. 21, 2021

(65) Prior Publication Data
US 2023/0159324 A1      May 25, 2023

(30) Foreign Application Priority Data

Apr. 13, 2020      (JP) ................................. 2020-071759

(51) Int. Cl.
*B01J 7/02*          (2006.01)
*C01B 3/001*         (2026.01)
(Continued)

(52) U.S. Cl.
CPC ................. *B01J 7/02* (2013.01); *C01B 3/001* (2013.01); *C01B 3/042* (2013.01); *C01C 1/04* (2013.01);
(Continued)

(58) Field of Classification Search
CPC ............ C01B 3/001; C01B 3/042; B01J 7/02
See application file for complete search history.

(56) References Cited

U.S. PATENT DOCUMENTS

2002/0025462 A1    2/2002  Nakanishi et al.
2005/0132640 A1    6/2005  Kelly et al.
(Continued)

FOREIGN PATENT DOCUMENTS

CN          101880046 A      11/2010
CN          110106512 A      8/2019
(Continued)

OTHER PUBLICATIONS

Machine Translation of JP 2012-206932 (Year: 2012).*
(Continued)

*Primary Examiner* — Lessanework Seifu
(74) *Attorney, Agent, or Firm* — Birch, Stewart, Kolasch & Birch, LLP

(57)          ABSTRACT

A hydrogen release and storage system (100) of the present invention includes a first hydrogen release and storage unit (100A) composed of a first hydrogen compound member (101A), a first container (102A) that accommodates the first hydrogen compound member (101A), a first heating apparatus (103A) configured to heat an inside of the first container (102A), a first cooling apparatus (104A) configured to cool the inside of the first container (102A), a first water supply apparatus (105A) configured to supply water to the first container (102A), a second hydrogen release and storage unit (100B) composed of a second hydrogen compound
(Continued)

member (101B), a second container (102B) that accommodates the second hydrogen compound member (101B), a second heating apparatus (103B) configured to heat an inside of the second container (102B), a second cooling apparatus (104B) configured to cool the inside of the second container (102B) and a second water supply apparatus (105B) configured to supply water to the second container (102B).

13 Claims, 10 Drawing Sheets

(51) Int. Cl.

| | | |
|---|---|---|
| *C01B 3/042* | (2026.01) | |
| *C01C 1/04* | (2006.01) | |
| *C21B 13/00* | (2006.01) | |
| *F02C 6/14* | (2006.01) | |
| *H01M 8/04029* | (2016.01) | |
| *H01M 8/04082* | (2016.01) | |
| *H01M 8/04701* | (2016.01) | |
| *H01M 8/12* | (2016.01) | |

(52) U.S. Cl.
CPC ............ *C21B 13/0073* (2013.01); *F02C 6/14* (2013.01); *H01M 8/04029* (2013.01); *H01M 8/04201* (2013.01); *H01M 8/04708* (2013.01); *C21B 2100/62* (2017.05); *H01M 2008/1293* (2013.01)

(56) References Cited

U.S. PATENT DOCUMENTS

| | | | |
|---|---|---|---|
| 2006/0269470 A1* | 11/2006 | Zhang | H01M 8/04216 |
| | | | 423/648.1 |
| 2012/0100062 A1 | 4/2012 | Nakamura et al. | |
| 2019/0315628 A1 | 10/2019 | Kondo et al. | |
| 2022/0105488 A1 | 4/2022 | Hikita et al. | |

FOREIGN PATENT DOCUMENTS

| | | | |
|---|---|---|---|
| EP | 1 170 249 A1 | 1/2002 | |
| EP | 2 455 336 A1 | 5/2012 | |
| EP | 3 208 877 A2 | 8/2017 | |
| JP | 5-225996 A | 9/1993 | |
| JP | 2002-80202 A | 3/2002 | |
| JP | 2005-200245 A | 7/2005 | |
| JP | 2005-298302 A | 10/2005 | |
| JP | 2005-314151 A | 11/2005 | |
| JP | 2006-127917 A | 5/2006 | |
| JP | 2010-17700 A | 1/2010 | |
| JP | 2012-206932 A | 10/2012 | |
| JP | 2015-38039 A | 2/2015 | |
| JP | 2016-185899 A | 10/2016 | |
| JP | 2018-184340 A | 11/2018 | |
| JP | 2019-98328 A | 6/2019 | |
| JP | 2019-218251 A | 12/2019 | |
| WO | WO 2011/007493 A1 | 1/2011 | |
| WO | WO 2018/074518 A1 | 4/2018 | |

OTHER PUBLICATIONS

Certified Foreign Priority JP 2020-168605 for Hikita et al US 2022/0105488 (Year: 2020).

International Search Report for International Application No. PCT/JP2021/011681, dated Jun. 1, 2021, with English translation.

U.S. Office Action for U.S. Appl. No. 17/917,867, dated May 12, 2025.

Written Opinion of the International Searching Authority for International Application No. PCT/JP2021/011681, dated Jun. 1, 2021, with English translation.

Chinese Office Action and Search Report for Chinese Application No. 202180027904.1, dated Dec. 26, 2023, with English translation.

Jin et al., "New Energy Technology," Sinopec Press, 2nd edition, Jan. 31, 2020, 3 pages total.

International Search Report for International Application No. PCT/JP2021/014960, dated Jun. 29, 2021, with English translation.

Written Opinion of the International Searching Authority for International Application No. PCT/JP2021/014960, dated Jun. 29, 2021, with English translation.

* cited by examiner

● HYDROGEN(H)
◉ ELEMENT OTHER THAN HYDROGEN(X)

HYDROGEN RELEASE/STORAGE SYSTEM, HYDROGEN RELEASE/STORAGE METHOD, AMMONIA PRODUCTION EQUIPMENT, GAS TURBINE, FUEL CELL, AND STEEL MILL

TECHNICAL FIELD

The present invention relates to a hydrogen release and storage system, a hydrogen release and storage method, an ammonia production apparatus, a gas turbine, a fuel cell and an steel mill.

Priority is claimed on Japanese Patent Application No. 2020-071759, filed in Japan on Apr. 13, 2020, the content of which is incorporated herein by reference.

BACKGROUND ART

Hydrogen energy is in use in a variety of processes such as ammonia synthesis, gas combustion, the manufacture of solid oxide fuel cells and iron making. It is known that huge effort and cost are required to supply a hydrogen gas, which serves as a raw material, and there is a demand for a technique that improves the current situation. In addition, in processes where hydrogen energy is used, a large amount of exhaust heat is generated, and thus there is a demand for a method for effectively using exhaust heat.

CITATION LIST

Patent Literature

Patent Document 1
    PTC International Publication No. WO 2018/074518

SUMMARY OF INVENTION

Technical Problem

As a material that generates hydrogen, borohydrides are being studied. Patent Document 1 discloses a sheet containing a borohydride in a two-dimensional manner (Patent Document 1). However, when all of the hydrogen that is contained in the sheet has been generated, there is a need to supply a new sheet, and additional effort and money are required.

The present invention has been made in consideration of the above-described circumstances, and an objective of the present invention is to provide a hydrogen release and storage system, a hydrogen release and storage method, an ammonia production apparatus, a gas turbine, a fuel cell and a steel mill which enable the effective use of exhaust heat and suppression of the generation of additional energy necessary for hydrogen generation.

Solution to Problem

In order to solve the above-described problem, the present invention adopts the following means.

(1) A hydrogen release and storage system according to one aspect of the present invention includes a first hydrogen release and storage unit composed of a first hydrogen compound member, a first container that accommodates the first hydrogen compound member, a first heating apparatus configured to heat an inside of the first container, a first cooling apparatus configured to cool the inside of the first container, a first water supply apparatus configured to supply water to the first container, a second hydrogen release and storage unit composed of a second hydrogen compound member, a second container that accommodates the second hydrogen compound member, a second heating apparatus configured to heat an inside of the second container, a second cooling apparatus configured to cool the inside of the second container, and a second water supply apparatus that supplies water to the second container, wherein heating, cooling and supply of water are each independently executed on the inside of the first container and the inside of the second container.

(2) In the hydrogen release and storage system according to (1), the first heating apparatus and the second heating apparatus may be a same heating apparatus that is shared by the first hydrogen release and storage unit and the second hydrogen release and storage unit.

(3) In the hydrogen release and storage system according to any of (1) or (2), the first cooling apparatus and the second cooling apparatus may be the same cooling apparatus that is shared by the first hydrogen release and storage unit and the second hydrogen release and storage unit.

(4) In the hydrogen release and storage system according to any one of (1) to (3), the first water supply apparatus and the second water supply apparatus may be the same water supply apparatus that is shared by the first hydrogen release and storage unit and the second hydrogen release and storage unit.

(5) In the hydrogen release and storage system according to any one of (1) to (4), a stoichiometric ratio between an element other than a hydrogen element that configures each of the first hydrogen compound member and the second hydrogen compound member and the hydrogen element is preferably 1:1 to 3:4.

(6) In the hydrogen release and storage system according to (5), the element other than the hydrogen element may be boron.

(7) The hydrogen release and storage system according to any one of (1) to (6) may further include a switching apparatus configured to switch between a first state and a second state, the first state is a state where, in the first hydrogen release and storage unit, the first heating apparatus is driven and the first cooling apparatus and the first water supply apparatus are stopped, and in the second hydrogen release and storage unit, the second heating apparatus is stopped and the second cooling apparatus and the second water supply apparatus are driven and the second state is a state where, in the first hydrogen release and storage unit, the first heating apparatus is stopped and the first cooling apparatus and the first water supply apparatus are driven, and in the second hydrogen release and storage unit, the second heating apparatus is driven and the second cooling apparatus and the second water supply apparatus are stopped.

(8) A hydrogen release and storage method according to one aspect of the present invention is a hydrogen release and storage method in which the hydrogen release and storage system according to any one of (1) to (7) is used as a hydrogen supply source and alternately has a first step of heating the inside of the first container so as to reach 150° C. or higher, releasing hydrogen from the first hydrogen compound member, supplying water to the inside of the second container while cooling the inside of the second container so as to reach lower than 150° C. and absorbing the hydrogen into the second hydrogen compound member and a second step of supplying water to the inside of the first container while cooling the inside of the first container so as to reach lower than 150° C., absorbing the hydrogen into the first hydrogen compound member, and heating the inside of the second container so as to reach 150° C. or higher and releasing hydrogen from the second hydrogen compound member.

(9) An ammonia production apparatus according to one aspect of the present invention includes the hydrogen release and storage system according to any one of (1) to (7) as a hydrogen supply source.

(10) A gas turbine according to one aspect of the present invention includes the hydrogen release and storage system according to any one of (1) to (7) as a hydrogen supply source.

(11) A fuel cell according to one aspect of the present invention includes the hydrogen release and storage system according to any one of (1) to (7) as a hydrogen supply source.

(12) A steel mill according to one aspect of the present invention includes the hydrogen release and storage system according to any one of (1) to (7) as a hydrogen supply source.

Advantageous Effects of Invention

The hydrogen release and storage system of the present invention can be used as a hydrogen supply source in a variety of apparatuses in which hydrogen is used as a raw material. Furthermore, since hydrogen can be generated without newly adding energy by using exhaust heat that is generated in the apparatuses to heat the hydrogen compound member to generate hydrogen, it is possible to reduce the amount of natural gas used in association with the addition of energy.

In addition, the hydrogen release and storage system of the present invention is composed of two hydrogen release and storage units that function as hydrogen supply sources, and it is possible to independently control timings of hydrogen generation and hydrogen storage in each of the hydrogen release and storage units. Therefore, while the generation of hydrogen is stopped and hydrogen is stored in one unit, it is possible to generate hydrogen in the other unit. This makes it possible to generate hydrogen in any one of the hydrogen release and storage units at all times and makes it possible to relentlessly supply hydrogen to target apparatuses.

BRIEF DESCRIPTION OF DRAWINGS

FIG. 4 is a graph showing the relationship between the temperature of the hydrogen compound member and the amount of hydrogen that is generated from the hydrogen compound member.

FIG. 8 is a view schematically showing the configuration of an ammonia production apparatus to which the hydrogen release and storage system is applied.

FIG. 11 is a view schematically showing the configuration of a steel mill to which the hydrogen release and storage system is applied.

DESCRIPTION OF EMBODIMENTS

Hereinafter, a hydrogen release and storage system according to an embodiment to which the present invention is applied will be described in detail using drawings. In some of the drawings to be used in the following description, a characteristic portion is shown in an enlarged manner for convenience in order to facilitate the understanding of the characteristic, and the dimensional ratios and the like of each configurational element are not always the same as those in actual cases. In addition, materials, dimensions, and the like in the following description are simply exemplary examples, and the present invention is not limited thereto and can be appropriately modified and carried out within the scope of the gist of the present invention.

Figure 1:
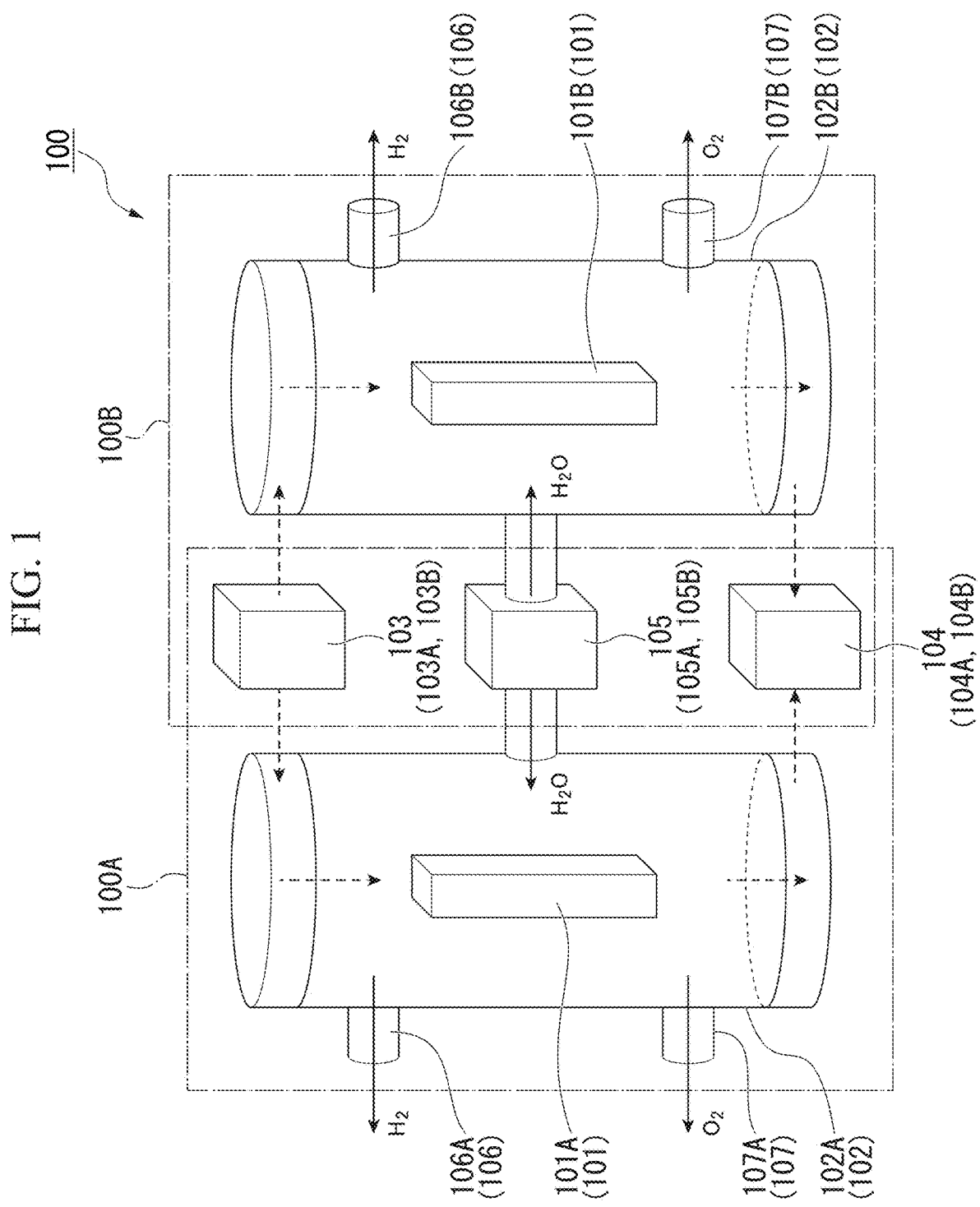
FIG. 1 is a view schematically showing the configuration of a hydrogen release and storage system according to one embodiment of the present invention.

FIG. 1 is a perspective view schematically showing the configuration of a hydrogen release and storage system 100 according to one embodiment of the present invention. The hydrogen release and storage system 100 includes a first hydrogen release and storage unit 100A and a second hydrogen release and storage unit 100B.

The first hydrogen release and storage unit 100A mainly includes a first hydrogen compound member 101 (101A), a first container (reaction container) 102 (102A) that accommodates the first hydrogen compound member 101, a first heating apparatus 103 (103A) configured to heat the inside of the first container 102, a first cooling apparatus 104 (104A) configured to cool the inside of the first container 102 and a first water supply apparatus 105A configured to supply water to the first container 102.

The second hydrogen release and storage unit 100B mainly includes a second hydrogen compound member 101 (101B), a second container (reaction container) 102 (102B) that accommodates the second hydrogen compound member 101, a second heating apparatus 103 (103B) configured to heat the inside of the second container 102, a second cooling apparatus 104 (104B) configured to cool the inside of the second container 102 and a second water supply apparatus 105B configured to supply water to the second container 102.

The first heating apparatus 103A and the second heating apparatus 103B may be mutually independent heating apparatuses, but may also be a same heating apparatus 103 that are shared by the first hydrogen release and storage unit 100A and the second hydrogen release and storage unit 100B as shown in FIG. 1.

The first cooling apparatus 104A and the second cooling apparatus 104B may be mutually independent cooling apparatuses, but may also be the same cooling apparatus 104 that is shared by the first hydrogen release and storage unit 100A and the second hydrogen release and storage unit 100B.

The first water supply apparatus 105A and the second water supply apparatus 105B may be mutually independent water supply apparatuses, but may also be the same water supply apparatus 105 that is shared by the first hydrogen release and storage unit 100A and the second hydrogen release and storage unit 100B.

Heating, cooling and supply of water are each independently executed on the inside of the first container 102A and the inside of the second container 102B using separate control means (apparatuses).

The stoichiometric ratio between an element X other than a hydrogen element that configures each of the first hydrogen compound member 101A and the second hydrogen compound member 101B and a hydrogen element H is 1:1 to 3:4 (for example, XH, $XH_2$, $XH_2$, $XH_3$, $XH_4$, $X_2H_3$ or $X_3H_4$). Examples of the element other than a hydrogen element include boron B.

In the side wall portion of the first container 102A, a first hydrogen release portion 106A (106) that releases hydrogen generated from the first hydrogen compound member 101A to the outside of the first container 102A and a first oxygen release portion 107A (107) that releases oxygen that is generated from supplied water to the outside are provided apart from each other. Similarly, in the side wall portion of the second container 102B, a second hydrogen release portion 106B (106) that releases hydrogen generated from the second hydrogen compound member 101B to the outside of the second container 102B and a second oxygen release portion 107B (107) that releases oxygen that is generated from supplied water to the outside are provided apart from each other.

The heating apparatus 103 (the first heating apparatus 103A and the second heating apparatus 103B) may be in direct contact with or may not be in contact with the hydrogen compound member 101 (the first hydrogen compound member 101A and the second hydrogen compound member 101B) to be heated. Here, a heating apparatus that is attached to the outsides of the containers 102 (the first container 102A and the second container 102B) is an exemplary example. As the heating apparatus 103, a combustor, an electric heater, a steam heating apparatus and the like are exemplary examples.

The cooling apparatus 104 (the first cooling apparatus 104A and the second cooling apparatus 104B) may be attached to the outside of the container 102 or accommodated in the container 102 as long as the hydrogen compound member 101 (the first hydrogen compound member 101A and the second hydrogen compound member 101B) in the container 102 (the first container 102A and the second container 102B) can be cooled. As the cooling apparatus 104, an air cooler, a water cooler and other refrigerant-type cooling apparatuses are exemplary examples. For cooling, the inside of the container 102 may be opened and left to stand in the atmosphere without using the cooling apparatus 104.

The water supply apparatus 105 (the first water supply apparatus 105A and the second water supply apparatus 105B) supplies a fluid containing liquid or gaseous water as a main component to the inside of the container 102 (the first container 102A and the second container 102B). When the temperature of the fluid becomes close to the intended cooling temperature, since it is possible to make the water to be supplied function as a refrigerant, the water supply apparatus 105 is capable of functioning as the cooling apparatus 104 as well.

As a first state, a state where, in the first hydrogen release and storage unit 100A, the first heating apparatus 103A is driven and the first cooling apparatus 104A and the first water supply apparatus 105A are stopped and, in the second hydrogen release and storage unit 100B, the second heating apparatus 103B is stopped and the second cooling apparatus 104B and the second water supply apparatus 105B are driven is defined. In addition, as a second state, a state where, in the first hydrogen release and storage unit 100A, the first heating apparatus 103A is stopped and the first cooling apparatus 104A and the first water supply apparatus 105A are driven and, in the second hydrogen release and storage unit 100B, the second heating apparatus 103B is driven and the second cooling apparatus 104B and the second water supply apparatus 105B are stopped is defined. At this time, the hydrogen release and storage system 100 may further include a switching apparatus (not shown) configured to switch between the first state and the second state.

Figure 2:
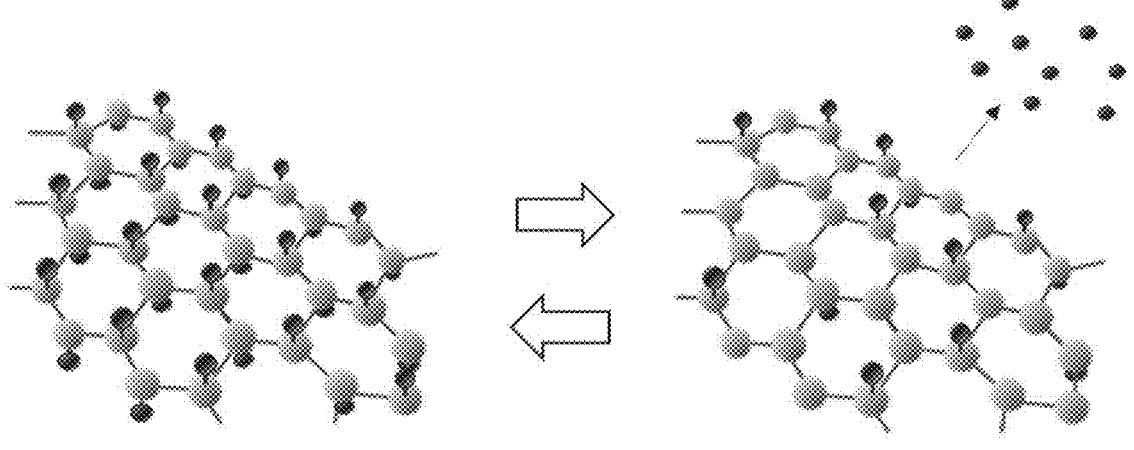
FIG. 2 is a view schematically showing the configurations of a hydrogen compound member in a hydrogen absorption state and in a hydrogen release state.

FIG. 2 is a view schematically showing the configurations of the hydrogen compound member 101 in a hydrogen absorption state (left-hand side) where hydrogen elements bond to (are stored in) almost all bonding sites of an X element that configures a hydrogen compound and in the hydrogen release state (right-hand side) where no hydrogen elements bond to some of the bonding sites of the X element due to hydrogen release.

When the first hydrogen release and storage unit 100A and the second hydrogen release and storage unit 100B that configure the hydrogen release and storage system of the present embodiment are each used as a hydrogen supply source, it is possible to carry out a hydrogen release and storage method in the following procedure.

Hydrogen Release Step

Figure 3:
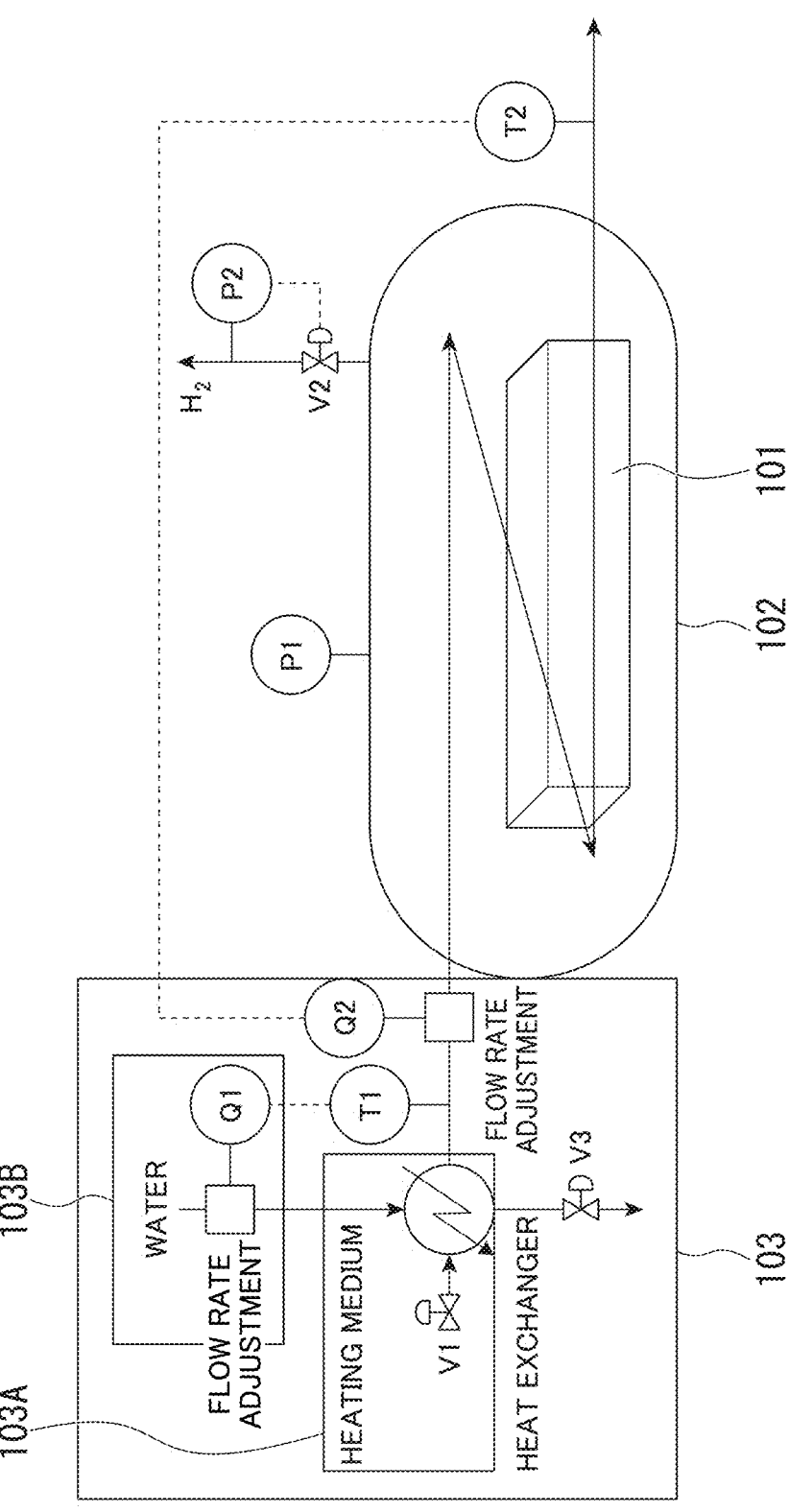
FIG. 3 is a view schematically showing the configuration of a facility that is used in a hydrogen release step in a hydrogen release and storage method according to one embodiment of the present invention.

FIG. 3 is a view schematically showing the configuration of a facility that is used in a hydrogen release step. The heating apparatus 103 is composed of means for supplying a heating medium (first heating apparatus) 103A and means for adjusting the temperature of the heating medium (second heating apparatus) 103B. The cooling apparatus 104 and the water supply apparatus 105 that are not used in this step are not shown.

Figure 4:
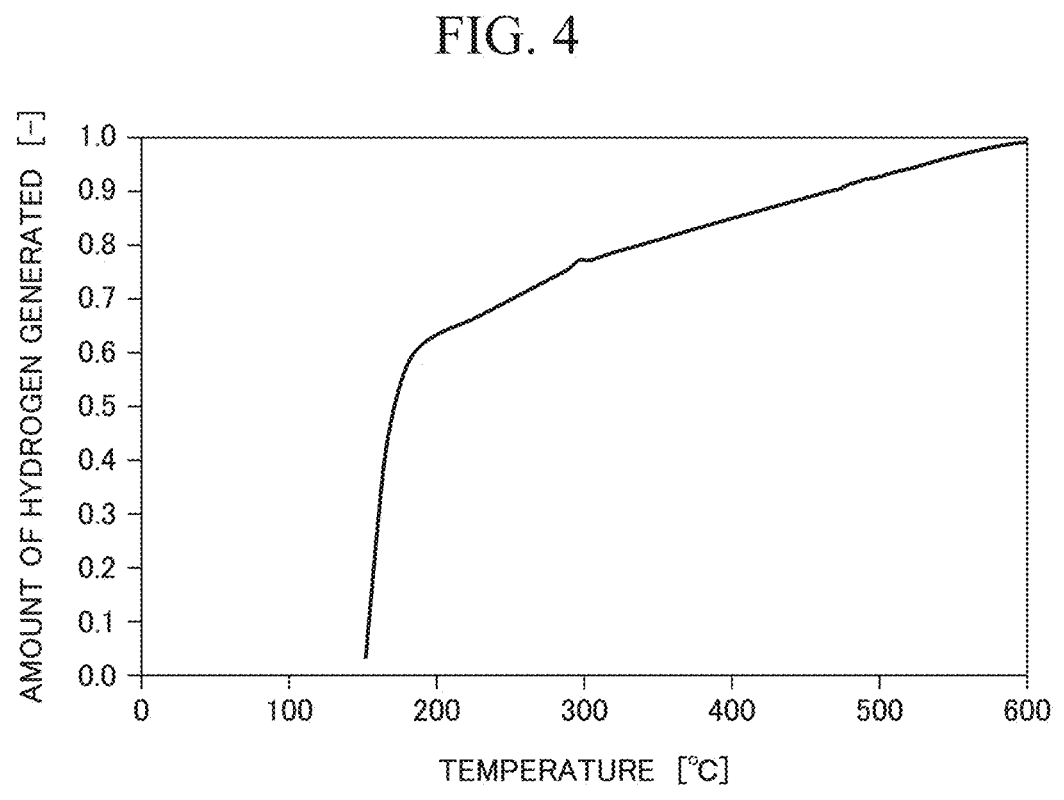

FIG. 4 is a graph showing the relationship between the temperature of the hydrogen compound member 101 and the amount of hydrogen that is generated from the hydrogen compound member 101 (the amount of hydrogen generated). As shown in this graph, the hydrogen compound member 101 is made to generate hydrogen at a temperature of 150° C. or higher. Therefore, first, the hydrogen compound member 101 in the hydrogen storage state shown in the left-hand side of FIG. 2 is disposed in the container 102, subsequently, the inside of the container 102 is heated using the heating apparatus 103 so as to reach 150° C. or higher (preferably 150° C. or higher and 300° C. or lower), and the hydrogen compound member 101 is made to release hydrogen. The inside of the container 102 is heated by supplying the heating medium into the container 102. At the same time, the temperature of the heating medium is adjusted using the second heating apparatus 103B in order to prevent the temperature from excessively rising. This makes the hydrogen compound member 101 lose some hydrogen and fall into the hydrogen release state shown in the right-hand side of FIG. 2.

Figure 5:
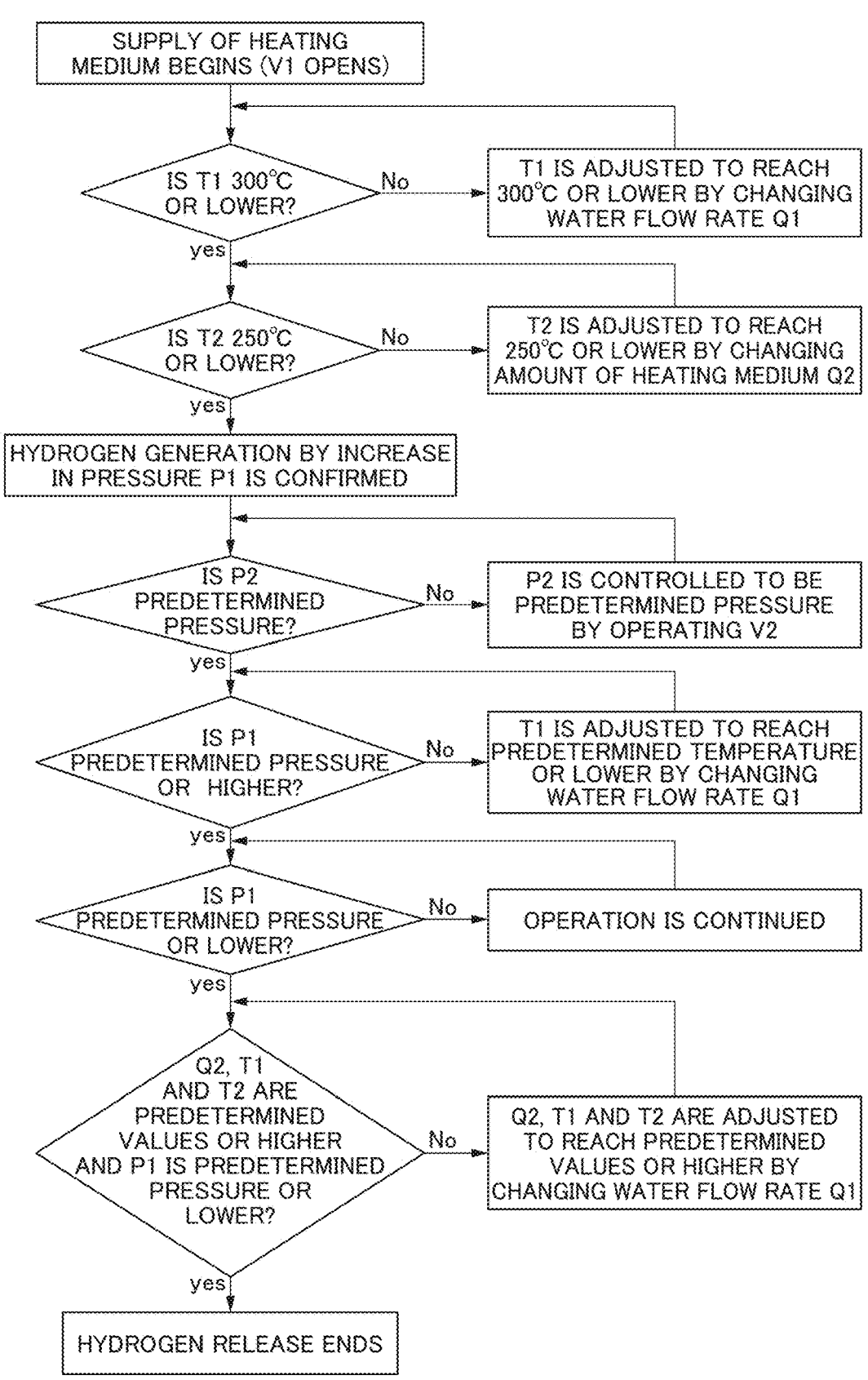
FIG. 5 is the flow of a process that is included in the hydrogen release step.

FIG. 5 shows the flow of a more detailed process that is included in an actual hydrogen release step. First, the supply of the heating medium is begun, and the temperature T1 of the inside of the container 102 on a side where the heating medium is disposed is controlled so as to become a temperature of 300° C. or lower. If the temperature exceeds 300° C., the temperature T1 is controlled so as to become 300° C. or lower by changing the flow rate of water Q1.

Next, the temperature T2 of the container 102 on a side where the heating medium is not disposed is controlled so as to become a temperature of 250° C. or lower. If the temperature exceeds 250° C., the temperature T2 is controlled so as to become 250° C. or lower by changing the heating medium flow rate Q2.

Next, the pressure P1 in the container 102 is measured, and whether or not hydrogen is generated depending on an increase in pressure is confirmed. Whether or not the pressure P2 of hydrogen H$_2$ that is released from the container 102 is a predetermined pressure or higher is determined. In a case where the pressure P2 is lower than the predetermined pressure, the pressure P2 is controlled so as to reach the predetermined pressure by operating a valve V2.

Next, whether or not the pressure P1 in the container 102 is a predetermined pressure or higher is determined. In a case where the pressure P1 is lower than the predetermined pressure, the pressure P1 is controlled so as to reach the predetermined pressure by changing the flow rate of water Q1. Subsequently, again, whether or not the pressure P1 in the container 102 is the predetermined pressure or higher is determined. In a case where the pressure P1 is lower than the predetermined pressure, the same determination is repeated by continuing the operation.

Next, whether or not Q2, T1 and T2 are the predetermined values or higher and P1 is the predetermined pressure or lower, that is, a state where the release of H$_2$ is stopped has been formed in spite of the supply of heat is determined. In a case where these fail to satisfy the predetermined values, Q2, T1 and T2 are adjusted so as to reach the predetermined values or higher by changing the water flow rate Q1. In a case where these satisfy the predetermined values, the release of hydrogen is ended.

Hydrogen Storage Step

Figure 6:
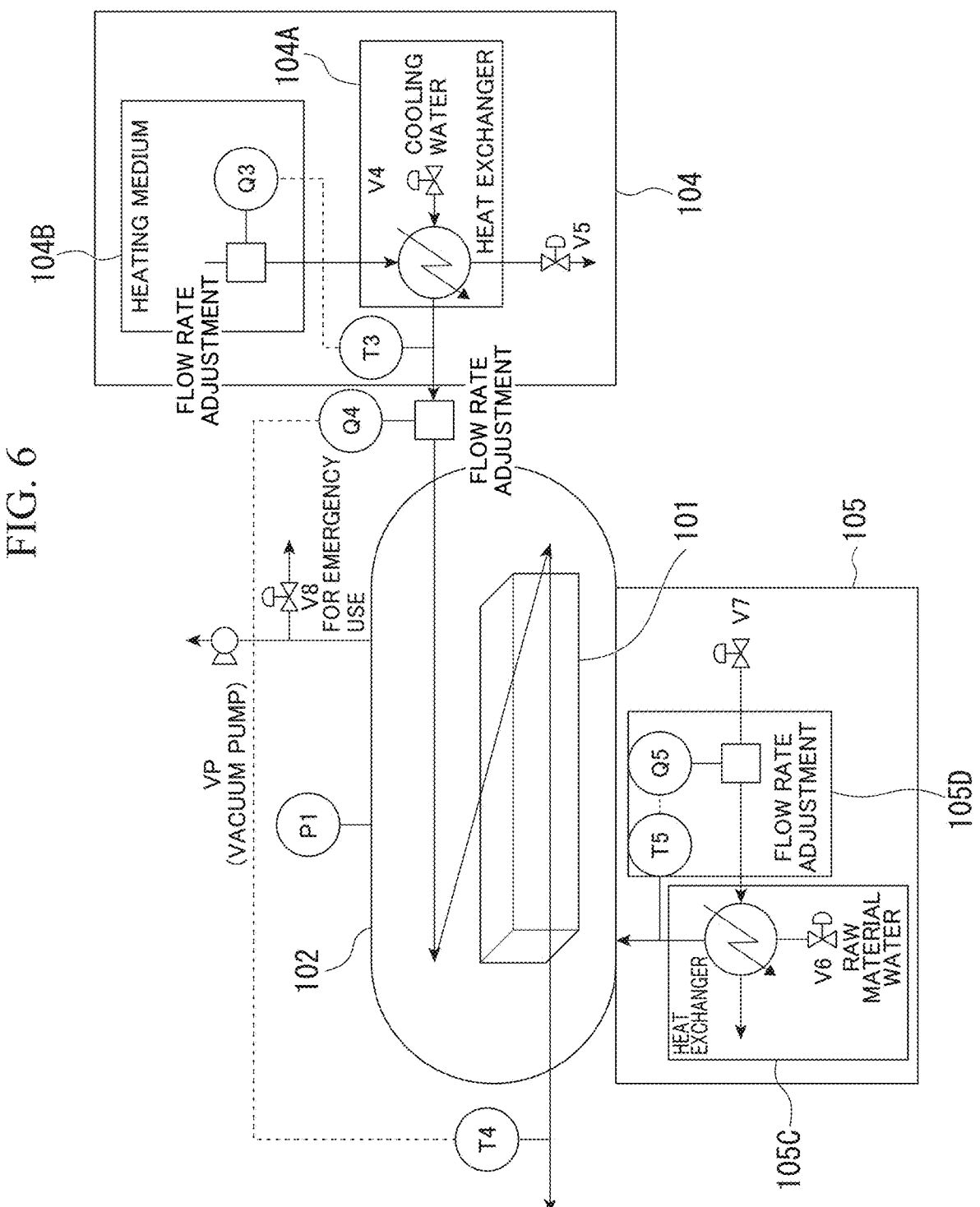
FIG. 6 is a view schematically showing the configuration of a facility that is used in a hydrogen storage step in a hydrogen release and storage method according to one embodiment of the present invention.

FIG. 6 is a view schematically showing the configuration of a facility that is used in a hydrogen storage step. The cooling apparatus 104 is composed of means for supplying a cooling water (first cooling apparatus) 104A and means for adjusting the temperature of the cooling water (second cooling apparatus) 104B. In addition, the water supply apparatus 105 is composed of means for supplying a raw material water (first water supply apparatus) 105A and means for adjusting the flow rate of the raw material water to be supplied (second water supply apparatus) 105B. The heating apparatus 103 that is not used in this step is not shown.

Next, water is supplied into the container 102 while cooling the inside of the container 102 so as to reach lower than 150° C. (preferably 80° C. or higher and 150° C. or lower) using the cooling apparatus 104, and hydrogen is absorbed into the hydrogen compound member 101. Hydrogen thermally decomposed from the water due to the temperature in the container 102 bond to a non-bonding site of the hydrogen compound member 101, whereby the hydrogen compound member 101 returns to the hydrogen storage state shown on the left-hand side of FIG. 2.

Figure 7:
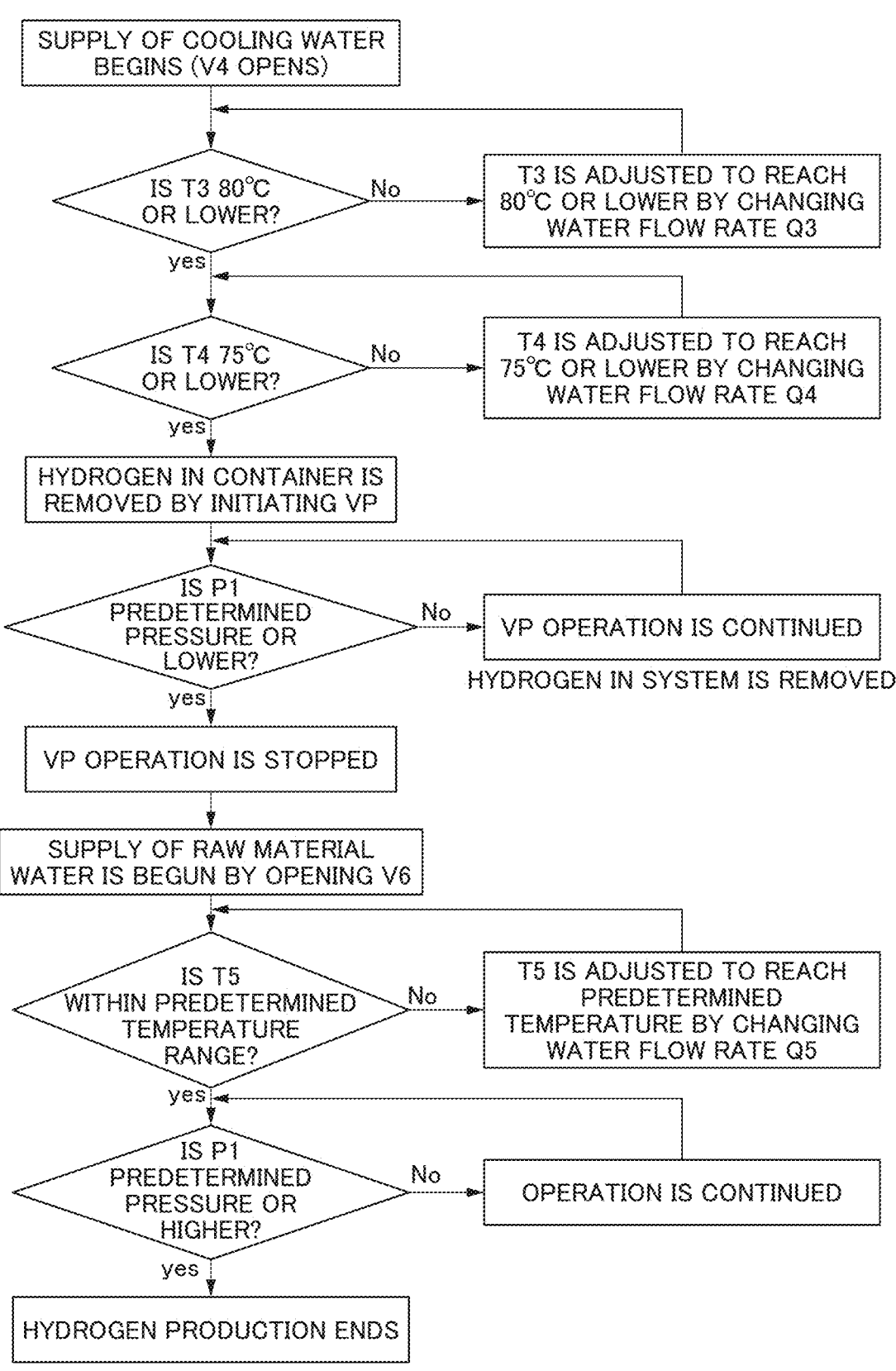
FIG. 7 is the flow of a process that is included in the hydrogen storage step.

When the hydrogen release step and the hydrogen absorption step are carried out alternately, it is possible to continuously supply hydrogen to predetermined facilities. FIG. 7 shows the flow of a more detailed process that is included in an actual hydrogen storage step. First, the supply of the cooling water is begun, and the temperature T3 of the inside of the container 102 on a side where the cooling water is disposed is controlled so as to become a temperature of 80° C. or lower. If the temperature exceeds 80° C., the temperature T1 is controlled so as to become 80° C. or lower by changing the water flow rate Q3.

Next, the temperature T4 of the container 102 on a side where the cooling water is not disposed is controlled so as to become a temperature of 75° C. or lower. If the temperature exceeds 75° C., the temperature T1 is controlled so as to become 75° C. or lower by changing the amount of the cooling water Q4.

Next, hydrogen in the container 102 is removed by initiating VP. The operation of VP is continued until the pressure P1 reaches a predetermined pressure or lower, thereby further removing hydrogen in the container 102.

Next, the operation of VP is stopped, and the supply of the raw material water is begun by opening V6. Next, the temperature of the raw material water is adjusted so as to be in a predetermined temperature range by changing the water flow rate Q5.

Next, whether or not the pressure P1 in the container is the predetermined pressure or higher is determined, and, in a case where the pressure P1 is lower than the predetermined pressure, the operation is continued until the pressure P1 reaches the predetermined pressure or higher. When the pressure P1 is the predetermined pressure or higher, the production of hydrogen is ended.

A hydrogen release and storage method of the present embodiment alternately has a first step that is a combination of the hydrogen release step with the first hydrogen release and storage unit 100A and the hydrogen storage step with the second hydrogen release and storage unit 100B and a second step that is a combination of the hydrogen storage step with the first hydrogen release and storage unit 100A and the hydrogen release step with the second hydrogen release and storage unit 100B.

More specifically, the first step is a step of heating the inside of the first container 102A so as to reach 150° C. or higher, releasing hydrogen from the first hydrogen compound member 101A, supplying water to the inside of the second container 102B while cooling the inside of the second container 102B so as to reach lower than 150° C. and absorbing the hydrogen into the second hydrogen compound member 101B.

More specifically, the second step is a step of supplying water to the inside of the first container 102A while cooling the inside of the first container 102A so as to reach lower than 150° C., absorbing the hydrogen into the first hydrogen compound member 101A, heating the inside of the second container 102B so as to reach 150° C. or higher and releasing hydrogen from the second hydrogen compound member 101B.

As described above, the hydrogen release and storage system 100 of the present embodiment can be used as a hydrogen supply source in a variety of apparatuses in which hydrogen is used as a raw material. Furthermore, since hydrogen can be generated without newly adding energy by using exhaust heat that is generated in the apparatuses to heat the hydrogen compound member 101 to generate hydrogen, it is possible to reduce the amount of natural gas used in association with the addition of energy.

In addition, the hydrogen release and storage system 100 of the present embodiment is composed of two hydrogen release and storage units 100A and 100B that function as hydrogen supply sources, and it is possible to independently control timings of hydrogen generation and hydrogen storage in each of the hydrogen release and storage units. Therefore, while the generation of hydrogen is stopped and hydrogen is stored in one unit, it is possible to generate hydrogen in the other unit. This makes it possible to generate hydrogen in any one of the hydrogen release and storage units at all times and makes it possible to relentlessly supply hydrogen to target apparatuses.

Hereinafter, application examples of the hydrogen release and storage system 100 of the present embodiment will be listed.

Application Example 1

Figure 8:
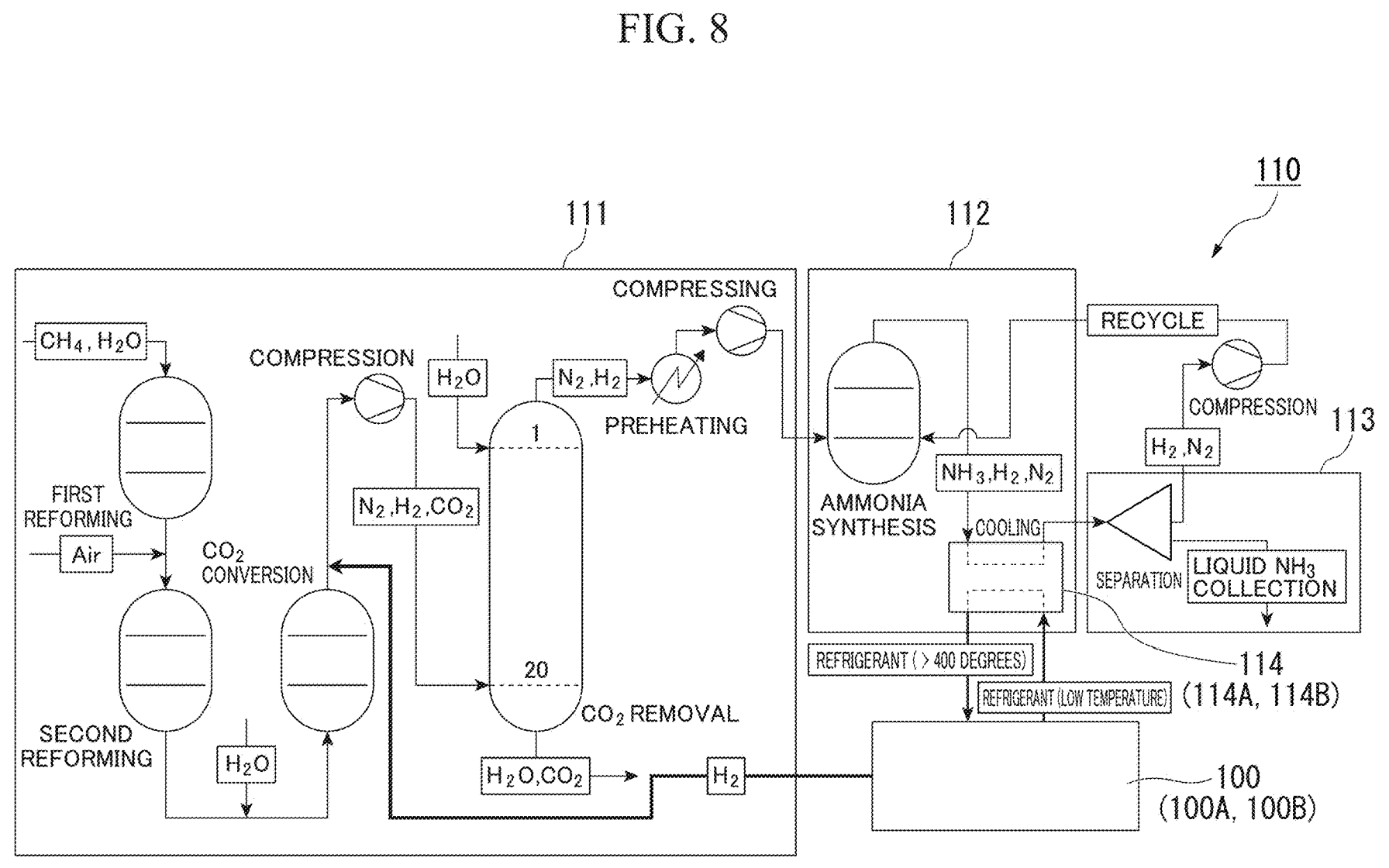

FIG. 8 is a view schematically showing the configuration of an ammonia production apparatus 110 to which the hydrogen release and storage system 100 is applied. The ammonia production apparatus 110 is mainly composed of a raw material preparation portion 111, an ammonia synthesis portion 112 and an ammonia collection portion 113. The heating apparatus and the cooling apparatus that configure the hydrogen release and storage system 100 can be made to function as a temperature adjustment apparatus 114 that adjusts the temperature of generated ammonia.

The first heating apparatus 103A and the first cooling apparatus 104A may be a first temperature adjustment apparatus 114A that adjusts the temperature of one part of the generated ammonia, and the second heating apparatus 103B and the second cooling apparatus 104B may be a second temperature adjustment apparatus 114B that adjusts the temperature of the other part of the generated ammonia.

The use of exhaust heat having a medium temperature of approximately 400° C. that is generated in association with ammonia synthesis makes it possible to heat the hydrogen compound member 101 with no additional energy and to generate hydrogen. When the generated hydrogen is supplied at a predetermined timing of raw material preparation, it becomes possible to synthesize additional ammonia using this hydrogen as a raw material. This makes it possible to reduce the amount of a methane raw material that is injected as a raw material for ammonia synthesis.

Application Example 2

Figure 9:
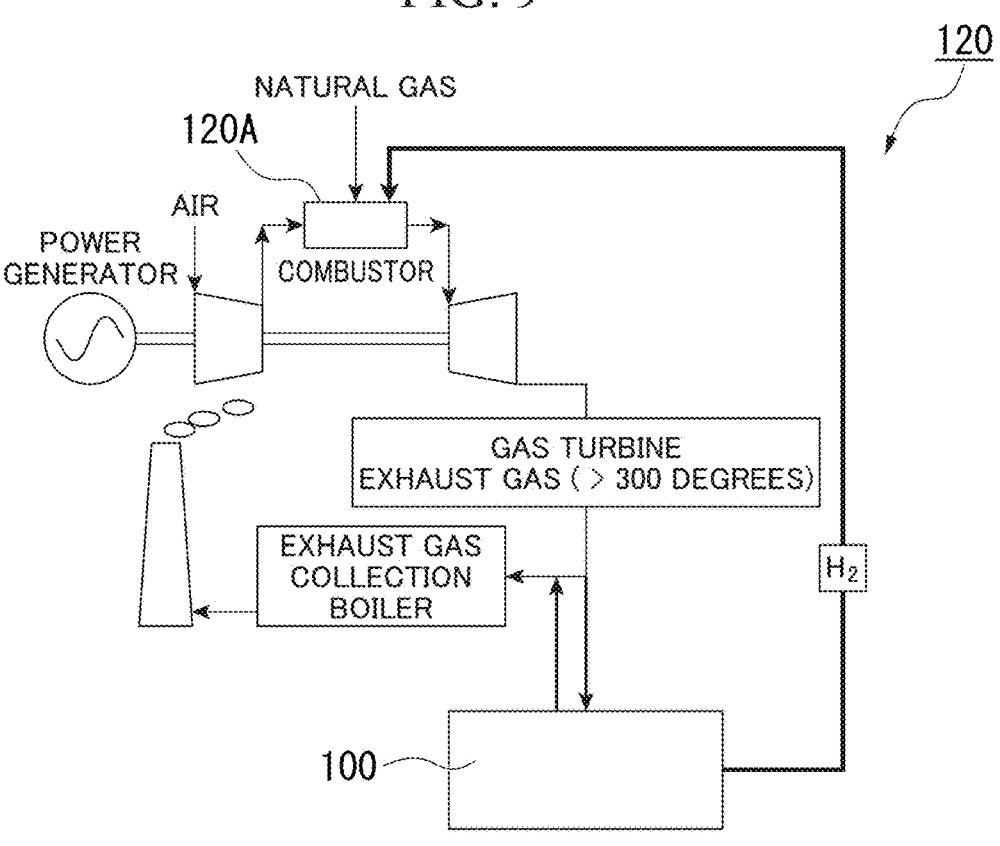
FIG. 9 is a view schematically showing the configuration of a gas turbine to which the hydrogen release and storage system is applied.

FIG. 9 is a view schematically showing the configuration of a gas turbine 120 to which the hydrogen release and storage system 100 is applied. The use of exhaust heat of approximately 300° C. that is generated in the gas turbine 120 makes it possible to heat the hydrogen compound member 101 with no additional energy and to generate hydrogen. When the generated hydrogen is supplied to a combustor 120A that configures the gas turbine 120, additional gas turbine combustion becomes possible using this hydrogen as a fuel. This makes it possible to reduce the amount of natural gas that is injected as a fuel for gas turbine combustion.

Application Example 3

Figure 10:
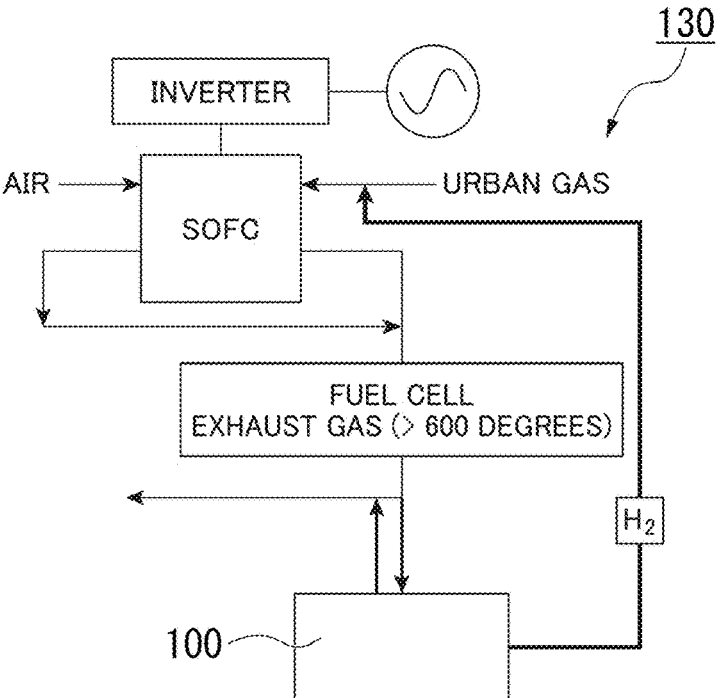
FIG. 10 is a view schematically showing the configuration of a fuel cell to which the hydrogen release and storage system is applied.

FIG. 10 is a view schematically showing the configuration of a solid oxide fuel cell (SOFC) 130 to which the hydrogen release and storage system 100 is applied. The use of exhaust heat of approximately 600° C. to 1200° C. that is generated in the production process of the fuel cell 130 makes it possible to heat the hydrogen compound member 101 with no additional energy and to generate hydrogen. When the generated hydrogen is supplied to the fuel cell 130, the hydrogen can be used as a fuel of the fuel cell. This makes it possible to reduce the amount of natural gas that is injected as a fuel of the fuel cell.

Application Example 4

Figure 11:
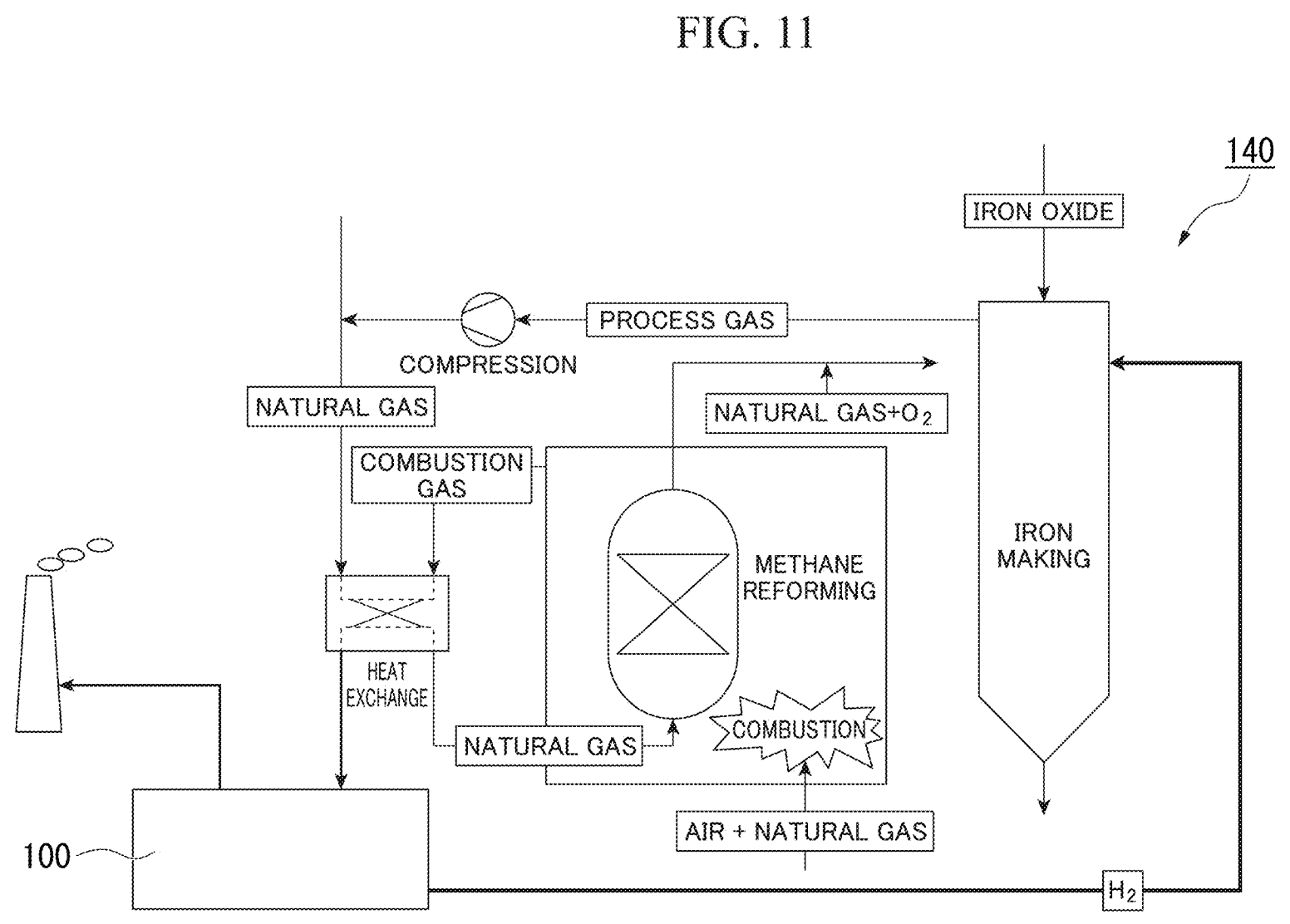

FIG. 11 is a view schematically showing the configuration of a steel mill 140 to which the hydrogen release and storage system 100 is applied. The use of exhaust heat that is generated in an iron-making step makes it possible to heat the hydrogen compound member 101 with no additional energy and to generate hydrogen. The generated hydrogen can be used as a raw material for iron reduction for iron making ($Fe_2O_3+3H_2 \rightarrow 2Fe+3H_2O$). This makes it possible to reduce the amount of natural gas that is injected as a raw material for iron reduction.

REFERENCE SIGNS LIST

100 Hydrogen release and storage system
100A First hydrogen release and storage unit
100B Second hydrogen release and storage unit
101 Hydrogen compound member
101A First hydrogen compound member
101B Second hydrogen compound member
102 Container
102A First container
102B Second container
103 Heating apparatus
103A First heating apparatus
103B Second heating apparatus
103C Heating medium supply means
103D Temperature adjustment means
104 Cooling apparatus
104A First cooling apparatus
104B Second cooling apparatus
104C Cooling water supply means
104D Temperature adjustment means
105 Water supply apparatus
105A First water supply apparatus
105B Second water supply apparatus
105C Raw material water supply means
105D Flow rate adjustment means
106 Hydrogen release portion
107 Oxygen release portion
110 Ammonia production apparatus
111 Raw material preparation portion
112 Ammonia synthesis portion
113 Ammonia collection portion
114 Temperature adjustment apparatus
120 Gas turbine
120A Combustor
130 Fuel cell
140 Steel mill

What is claimed is:

1. A hydrogen release and storage system comprising:
a first hydrogen release and storage unit composed of a first hydrogen compound member,
a first container that accommodates the first hydrogen compound member,
a first heating apparatus configured to heat an inside of the first container,
a first cooling apparatus configured to cool the inside of the first container,
a first water supply apparatus configured to supply water to the first container, a second hydrogen release and storage unit composed of a second hydrogen compound member, a second container that accommodates the second hydrogen compound member, a second heating apparatus configured to heat an inside of the second container, a second cooling apparatus configured to cool the inside of the second container, and a second water supply apparatus configured to supply water to the second container, and a switching apparatus configured to switch between a first state and a second state, the first state is a state where, in the first hydrogen release and storage unit, the first heating apparatus is driven and the first cooling apparatus and the first water supply apparatus are stopped, and in the second hydrogen release and storage unit, the second heating apparatus is stopped and the second cooling apparatus and the second water supply apparatus are driven, and the second state is a state where, in the first hydrogen release and storage unit, the first heating apparatus is stopped and the first cooling apparatus and the first water supply apparatus are driven, and in the second hydrogen release and storage unit, the second heating apparatus is driven and the second cooling apparatus and the second water supply apparatus are stopped.

2. The hydrogen release and storage system according to claim 1, wherein the first heating apparatus and the second heating apparatus are a same heating apparatus that is shared by the first hydrogen release and storage unit and the second hydrogen release and storage unit.

3. The hydrogen release and storage system according to claim 1, wherein the first cooling apparatus and the second cooling apparatus are the same cooling apparatus that is shared by the first hydrogen release and storage unit and the second hydrogen release and storage unit.

4. The hydrogen release and storage system according to claim 1, wherein the first water supply apparatus and the second water supply apparatus are the same water supply apparatus that is shared by the first hydrogen release and storage unit and the second hydrogen release and storage unit.

5. The hydrogen release and storage system according to claim 1, wherein a stoichiometric ratio between an element other than a hydrogen element that configures each of the first hydrogen compound member and the second hydrogen compound member and the hydrogen element is 1:1 to 3:4.

6. The hydrogen release and storage system according to claim 5, wherein the element other than the hydrogen element is boron.

7. A hydrogen release and storage method in which the hydrogen release and storage system according to claim 1 is used as a hydrogen supply source, the method alternately comprising:

a first step of heating the inside of the first container so as to reach 150° C. or higher, releasing hydrogen from the first hydrogen compound member and supplying water to the inside of the second container while cooling the inside of the second container so as to reach lower than 150° C. and absorbing the hydrogen into the second hydrogen compound member; and a second step of supplying water to the inside of the first container while cooling the inside of the first container so as to reach lower than 150° C., absorbing the hydrogen into the first hydrogen compound member and heating the inside of the second container so as to reach 150° C. or higher and releasing hydrogen from the second hydrogen compound member.

8. An ammonia production apparatus comprising:

the hydrogen release and storage system according to claim 1 as a hydrogen supply source.

9. A gas turbine comprising:

the hydrogen release and storage system according to claim 1 as a hydrogen supply source.

10. A fuel cell comprising:

the hydrogen release and storage system according to claim 1 as a hydrogen supply source.

11. A steel mill comprising:

the hydrogen release and storage system according to claim 1 as a hydrogen supply source.

12. The hydrogen release and storage method according to claim 7, wherein the inside of the second container is cooled so as to reach 80° C. or higher and lower than 150° C. in the first step.

13. The hydrogen release and storage method according to claim 7, wherein the inside of the first container is cooled so as to reach 80° C. or higher and lower than 150° C. in the second step.

* * * * *